J. F. CRADDOCK.
MEASURING INSTRUMENT.
APPLICATION FILED APR. 30, 1917. RENEWED DEC. 23, 1918.

1,323,018.

Patented Nov. 25, 1919.

INVENTOR
John F. Craddock.

WITNESSES
John P. Woodworth
Lloyd W. Patch

BY Richard Owen
ATTORNEY

UNITED STATES PATENT OFFICE.

JOHN F. CRADDOCK, OF STIRLING CITY, CALIFORNIA.

MEASURING INSTRUMENT.

1,323,018.   Specification of Letters Patent.   Patented Nov. 25, 1919.

Application filed April 30, 1917, Serial No. 165,507. Renewed December 23, 1918. Serial No. 268,088.

*To all whom it may concern:*

Be it known that I, JOHN F. CRADDOCK, a citizen of the United States, residing at Stirling City, in the county of Butte and State of California, have invented certain new and useful Improvements in Measuring Instruments, of which the following is a specification.

This invention relates to an improvement in a measuring instrument, and more particularly to a device of this character which is intended to be used in leveling or plumbing, and in determining or securing any angle between these two extremes.

An object of my invention is to provide an instrument of small and convenient type which can be used in connection with a line, and which is so constructed that it may be used in leveling or in securing or measuring angles from the horizontal, and which in an interchanged connection can be used in measuring substantially vertical lines or planes and measuring angularly with respect to a plumb line.

A further object resides in so constructing the parts that adjustment can be made to secure accurate indication of the instrument.

Yet another object is to provide a cord attaching and indicating structure which is so located that it is presented for most convenient use.

A still further object resides in providing a handle upon the casing structure of the instrument, which handle is so connected and mounted that it may be used in bringing the instrument to the proper measuring relation.

With the above and other objects in view, which will be in part described and in part understood from the specification, drawings, and claims, my invention consists in certain novel features of construction and combinations of parts which will be hereinafter more fully set forth.

In the drawings:—

Figure 2:
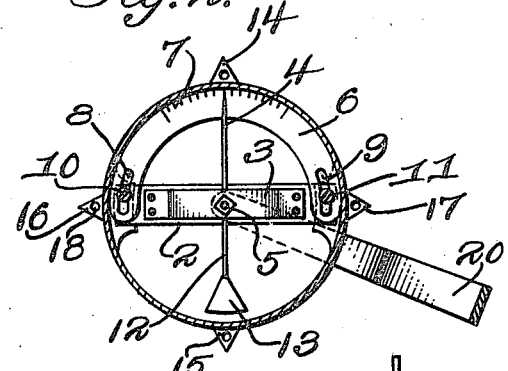
Fig. 2 is a view similar to Fig. 1 but showing the parts in vertical section.

The indicating mechanism of the instrument is contained within the case 1, which to all intents and purposes might be of substantially the same size and design as a watch case, and this case preferably has at least one of the sides thereof mounted to be capable of being opened by being hinged, bezeled, or otherwise fitted. While the case 1 might be made square or of other desired configuration, it is perhaps preferable that it be shaped to be substantially circular when viewed in side elevation, as is shown in the drawings. A supporting bar 2 is mounted within the case to be disposed substantially diametrically across the center thereof, as is shown in Fig. 2, and a bearing member 3 is mounted on and slightly spaced from the supporting bar 2 at one side thereof, a clearance space thus being provided for the reception of the indicator hand 4. A pin, screw, or other suitable pivoting means is passed through the bearing member 3 and through the indicator hand 4, to hold the indicator hand properly located within the case, this pin 5 pivoting the indicator hand at substantially the center of the case. A plate 6 has indicator dial markings thereon as shown at 7, and at substantially diametrically opposite points this dial plate has the openings 8 and 9 provided, screws 10 and 11 being passed through these openings and screwed into properly located threaded orifices in the supporting bar 2 or in other substantially fixed parts of the instrument.

The indicator hand 4 has an extension 12, and a pendulum or balance weight 13 is provided on the end of this extension 12 so that as the case may be turned, the pendulum weight 13 will act at all times to move the indicator hand 4 into a substantially vertical position, it of course being understood that the indicator hand works adjacent the dial markings on the plate 6.

A central or squaring marking will be provided on the dial plate 6 substantially at the point occupied by the indicator hand 4, as the same is shown in the drawings, and then the dial markings 7 will be indicated on each side of this central marking to take in substantially 45°, more or less. A spur-like extension 14 is carried on the outer wall of the case at such a location that the point thereof is cut by a radial line extending through the squaring marking of the dial plate 6, and an indicating spur 15 is carried by the case at a point diametrically opposite to the position occupied by the spur member 14. To all intents and purposes, that portion of the case from which the spur 14 is disposed might be referred to as the top, it being the intention that this portion shall be at all times disposed upwardly, and the portion of the case having the spur 15 carried therefrom might be considered as the bottom. At the sides and substantially half way between the spurs 14 and 15, indicating spurs 16 and 17 are provided, it being understood that the points of the indicating spurs 14, 17, 15 and 16 will be so disposed that between two adjacent spurs an angle of 90° is represented, considering the pivot pin 5 as a center. Each of the various spurs has a line receiving opening 18 formed therethrough, and these various openings are formed through the spurs at such points that they will be cut by radial lines taken through the pointed ends of the spurs.

One of the sides of the case 1 has an opening 19 provided therethrough so that the dial markings 7 of the plate 6 can be seen, and as the indicator hand 4 works adjacent these dial markings it will of course be understood that the relative angular disposition of the same with respect to the dial markings can be viewed through the openings 19. A strip of metal is bent to form a handle portion 20, and the case 1 is pivotally mounted within the handle portion by means of pins or screws 21 which have a common axis with the pivoting member 5 upon which the indicator hand 4 is mounted.

Figure 1:
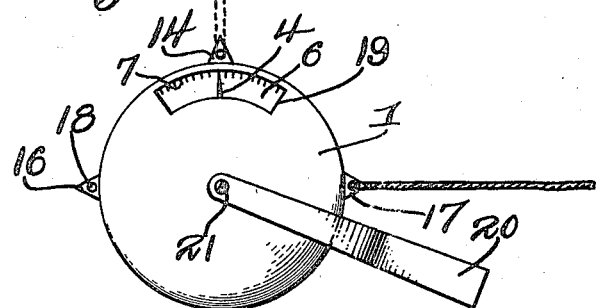
Figure 1 is a view in elevation showing the device of my invention and indicating the manner in which the same would be connected for use.

In the use of the device, a line will be passed through and secured in the opening 18 of one of the spurs and the remaining end of the line will be secured at one of the points from which the measurement is to be made. The handle 20 will then be grasped and the point of the spur opposite to that spur on which the line is secured will be brought to the remaining point for the measurement. As the line is drawn tight, the case 1 will be turned upon the pins 21 and in consequence when the spur diametrically opposite to that spur from which the line extends is brought to the point of measurement substantially a straight line will be represented from the extreme point of this spur to the remaining point of measurement where the line is secured and in consequence a line taken diametrically through the two spurs as mentioned will be coincident with the line of extent of the cord or line. As the pendulum weight 13 is balanced, the indicator hand 4 will stand at all times substantially vertically and any variation from a right angular setting with respect to the line drawn through the heretofore mentioned spurs will be indicated at one side or the other of the central marking on the dial plate 6. As the markings on the dial plate are given in degrees, and perhaps fractional parts thereof, a very accurate reading and determination of the slope of the line will be determined, and at the same time where a given angle or pitch is had and the line is to be stretched thereto, this can be accomplished by moving the instrument up or down until the proper degree is indicated on the dial markings. As has been stated, the handle 20 is pivotally mounted on the casing substantially on an axis continuous with the turning axis of the indicator hand, and this pivotal mounting is sufficiently loose so that the case has free play within the handle. When the handle is grasped and the case is moved to bring that spur opposite to the spur on which the line is attached to the point from or to which the measurement is to be made, the case will turn so that a proper adjustment will be had. In the use of the device, the cord or line can be attached as is shown in Fig. 1 or in substantially the relation as shown in the dotted lines, and also, attachment can be made to the two opposite spurs from those points of attachment as indicated.

Figure 3:
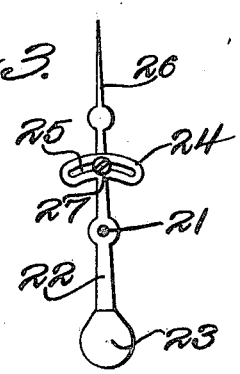
Fig. 3 is a detail view showing a slightly modified construction of certain of the parts.
Figure 4:
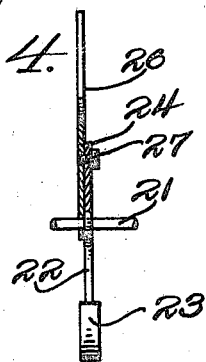
Fig. 4 illustrates in end elevation the structure as disclosed in Fig. 3 certain of the parts being broken to more clearly illustrate the manner of connecting and mounting.

In Figs. 3 and 4 I have illustrated a slightly modified form of construction which permits adjustment of the parts to facilitate changing or varying the setting of the pointer 26 and with the use of this structure the dial plate might be riveted or otherwise secured in a rigid mounting within the case and can be thus set to be incapable of any adjustment. A shaft 21 which corresponds substantially to the pivoting shaft 5 has an arm 22 fixedly mounted thereon and provided with extensions on both sides of the shaft, a pendulum weight 23 being carried at the end of one of the arms and the remaining end being widened out as shown at 24 and provided with an arcuate slot 25, which slot is formed around the center of the shaft 21. An indicator hand 26 is swingingly mounted on the shaft 21 adjacent the mounting of the arm 22 and a set screw 27 is passed through the slot 25 of the member 22 and into a screw threaded opening of the indicator hand so that by loosening the set screw the indicator hand can be moved and adjusted to normally stand in line with or at an angle to the line of extent of the end of the arm 22 on which the pendulum weight 23 is carried by providing the adjustment as disclosed. If the pendulum weight should perchance be so made that it does not hold the arm 22 in a vertically disposed relation or if through any other cause the point of the indicator hand 26 should not register properly with the dial markings, the desired adjustment can be obtained by shifting the indicator hand to the one side or the other and then tightening the same by the use of the set screw 27, or where the parts are constructed as disclosed in Fig. 2, this same result can be obtained by shifting or turning the dial plate 6 to the one side or the other within the case.

From the foregoing it will be seen that I have provided a measuring instrument which can be used in measuring and determining the perpendicular and horizontal or various degrees of angularity on either side of such measurement and at the same time is adaptable for use in connection with a line to measure and to determine if lines or planes are strictly horizontal and vertical, or if not so to then give accurately and in degrees the variations which may exist.

While I have herein shown and described only certain specific forms and constructions of various parts, it will be understood that a number of changes and variations might be resorted to in the form and arrangement of the elements as well as in the manner of mounting and housing the same and hence I do not wish to be limited to the exact disclosure but rather to such points as are set forth in the claims.

I claim:—

1. A measuring instrument including a circular case having radiating measuring spurs thereon, a handle mounted in conjunction with the case by which the same may be held and presented with one of said measuring spurs in a position for use, and indicator means within the case to show the angular disposition of the points.

2. A measuring instrument including a case, an indicator hand mounted pivotally within the case, spurs carried by the case on the opposite sides of and in diametrical alinement with the pivotal center on which the indicator hand is mounted, said spurs being provided with openings to permit attachment of a line therethrough, and a pendulum weight mounted in conjunction with the indicator hand to cause the same to normally assume a vertical or plumb position.

3. A measuring instrument including a case, spurs carried by said case in horizontal and vertical alinement and diametrically opposed in their mounting, a dial plate within the case, an indicator hand pivotally mounted in the case to work adjacent the markings of the dial plate, a pendulum weight in conjunction with said indicator hand to cause the same to normally stand in a position of vertical extent, and means by which adjustment can be accomplished to insure accurate indication of the parts.

4. A measuring instrument including a case, spurs carried by said case in horizontal and vertical alinement and diametrically opposed in their mounting, a dial plate within the case, an indicator hand pivotally mounted in the case to work adjacent the markings of the dial plate, a pendulum weight in conjunction with said indicator hand to cause the same to normally stand in a position of vertical extent, means by which adjustment can be accomplished to insure accurate indication of the parts, said spurs having openings therethrough for securement of a line, and a handle pivotally mounted in conjunction with said case on an axis co-extensive with the pivotal axis of the indicator hand.

In testimony whereof I affix my signature in presence of two witnesses.

JOHN F. CRADDOCK.

Witnesses:
W. A. BREEDLOVE, Jr.,
J. B. GEIGER.